(12) United States Patent
Yang et al.

(10) Patent No.: US 12,294,323 B2
(45) Date of Patent: May 6, 2025

(54) METHOD FOR PRE-POSITIONING ROTOR OF OUTDOOR FAN IN HIGH-SPEED COUNTER-ROTATION STATE BEFORE OPERATION

(71) Applicant: Zhongshan Broad-Ocean Motor Co., Ltd., Zhongshan (CN)

(72) Inventors: Fei Yang, Zhongshan (CN); Min Wang, Zhongshan (CN); Song Luo, Zhongshan (CN); Chao Li, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 125 days.

(21) Appl. No.: 18/221,869

(22) Filed: Jul. 13, 2023

(65) Prior Publication Data

US 2024/0178777 A1    May 30, 2024

(30) Foreign Application Priority Data

Nov. 24, 2022    (CN) .......................... 202211478597.1

(51) Int. Cl.
    *H02P 21/34*      (2016.01)
    *H02P 21/18*      (2016.01)

(52) U.S. Cl.
    CPC .............. *H02P 21/34* (2016.02); *H02P 21/18* (2016.02); *H02K 2213/03* (2013.01); *H02P 2207/05* (2013.01)

(58) Field of Classification Search
    CPC ...... H02P 21/34; H02P 21/18; H02P 2207/05; H02P 1/46; H02P 6/182; H02P 6/20; H02P 6/22; H02P 6/28; H02P 2203/03; H02K 2213/03; Y02B 30/70; Y02E 10/72; F04D 25/08; F04D 27/008; H02M 1/088; H02M 7/53875
    USPC ............................. 318/400.02, 400.01, 700
See application file for complete search history.

(56) References Cited

U.S. PATENT DOCUMENTS 10,742,143 B2 *   8/2020    Roemmelmayer ..... H02P 6/185

FOREIGN PATENT DOCUMENTS

| CN | 108418480 A | 8/2018 |
|---|---|---|
| CN | 111740656 A | 10/2020 |
| CN | 113572397 A | 10/2021 |
| CN | 113765442 A | 12/2021 |
| CN | 114244223 A | 3/2022 |

(Continued)

*Primary Examiner* — David Luo
(74) *Attorney, Agent, or Firm* — MATTHIAS SCHOLL P.C.; Matthias Scholl (57) ABSTRACT

A method for pre-positioning a rotor of an outdoor fan in a counter-rotation state before operation includes: 1) during a counter-operation state, sending, by a microprocessor, a signal to the inverter circuit to turn off all upper electronic switching tubes and turn on all lower electronic switching tubes; 2) measuring a phase current of each phase coil winding in the stator assembly; 3) calculating a back electromotive force of each phase coil winding in the stator; 4) calculating a position angle of the rotor assembly; 5) checking if the phase current of each phase coil winding is all smaller than a preset threshold current; if not, return to 1); if yes, proceed to 6); and 6) calculating a resistance torque to stop the rotor assembly based on the position angle of the rotor assembly, and then stopping the rotor assembly to achieve pre-positioning of the rotor before starting.

10 Claims, 9 Drawing Sheets

(56) References Cited

FOREIGN PATENT DOCUMENTS

| | | | |
|---|---|---|---|
| JP | H07337080 | A | 12/1995 |
| JP | 2005057993 | A | 3/2005 |

\* cited by examiner

METHOD FOR PRE-POSITIONING ROTOR OF OUTDOOR FAN IN HIGH-SPEED COUNTER-ROTATION STATE BEFORE OPERATION

CROSS-REFERENCE TO RELATED APPLICATIONS

Pursuant to 35 U.S.C. § 119 and the Paris Convention Treaty, this application claims foreign priority to Chinese Patent Application No. 202211478597.1 filed Nov. 24, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for pre-positioning a rotor of an outdoor fan in a high-speed counter-rotation state before operation.

Before operation, an outdoor fan of an air conditioner may be in any of three states: stationary, spontaneous rotation with the wind, or spontaneous rotation against the wind. The success rate of starting the fan is high when the fan is stationary or rotates spontaneously with the wind, while the success rate decreases significantly when the fan rotates spontaneously against the wind.

Chinese Patent Publication No: CN103956940B provides a method or device for starting a DC motor in an air conditioner outdoor unit against the wind. The method uses three parameters, namely, bus current, bus voltage, and back electromotive force, to control the starting of the DC motor. However, the scheme is relatively vague and difficult to implement.

Chinese Patent Publication No: CN107317526B introduces a method for starting a sensorless permanent-magnet synchronous motor and provides a sensorless permanent-magnet synchronous motor. The method involves short-circuiting the coil winding of the stator to generate a braking torque when all the electronic switching tubes on the lower bridge arms are turned on. This causes the sensorless permanent-magnet synchronous motor to gradually decelerate when rotating with the wind or against the wind, and then the sensorless permanent-magnet synchronous motor is started. However, this method has a drawback: during an open-loop startup process, directly activating the short-circuit brake function may lead to a startup failure because of the non-convergence, caused by strong headwind, of the switching of the open-loop control to the closed-loop control.

The abovementioned patents focus on addressing the startup against the wind when the rotor rotates at low speed. However, in harsh environments, the success rate of conventional startup methods decreases significantly when a motor rotates at a high speed against the wind, such as at 800 rpm.

The current solution to improve the success rate of startup is to wait for the external wind to decrease and the motor changes from high-speed rotation to low-speed rotation against the wind (below 300 rpm). However, this solution still has the following problems or defects: (1) it requires waiting for the external wind to decrease before starting, which causes inconvenience for users if they need to use the air conditioner immediately; (2) during low-speed startup against the wind, if the external wind suddenly becomes strong, the fan will still rotate at high speed, leading to unstable startup.

SUMMARY

To solve the aforesaid problems, the disclosure provides a method for pre-positioning a rotor of an outdoor fan in a high-speed counter-rotation state before operation.

The outdoor fan comprises a permanent-magnet synchronous motor and a wind wheel. The permanent-magnet synchronous motor comprises a motor body and a motor controller. The motor body comprises a stator assembly and a permanent-magnet rotor assembly. The motor controller comprises a microprocessor and an inverter circuit. The inverter circuit comprises a plurality of bridge arms, and each bridge arm comprises an upper bridge arm and a lower bridge arm; each upper bridge arm comprises an upper electronic switching tube, and each lower bridge arm comprises a lower electronic switching tube. The method for pre-positioning the rotor comprises:

1) during the high-speed counter-operation state, sending, by the microprocessor, a signal to the inverter circuit to turn off all the upper electronic switching tubes and turn on all the lower electronic switching tubes, thereby achieving a short-circuit brake to reduce the counter-rotation speed of the wind wheel;
2) measuring a phase current of each phase coil winding in the stator assembly;
3) calculating a back electromotive force of each phase coil winding in the stator based on the phase current of each phase coil winding;
4) calculating a position angle $\theta_0$ of the rotor assembly based on the back electromotive force of each phase coil winding;
5) checking if the phase current of each phase coil winding is all smaller than a preset threshold current I0; if not, return to 1); if yes, proceed to 6); and
6) calculating a resistance torque to stop the rotor assembly based on the position angle $\theta_0$ of the rotor assembly, and then stopping the rotor assembly to achieve pre-positioning before starting.

The permanent-magnet synchronous motor is a three-phase permanent-magnet synchronous motor, and the phase currents flowing through the three-phase coil windings are respectively $i_a$, $i_b$, and $i_c$.

In 2), the phase currents $i_a$, $i_b$, and $i_c$ are detected through current sensors or sampling resistors.

In 3), the reverse electromotive force of each phase coil winding is calculated as follows:

$$\begin{cases} e_a = (j\omega L_s + R_s)i_a \\ e_b = (j\omega L_s + R_s)i_b \\ e_c = (j\omega L_s + R_s)i_c \end{cases}$$

where, $e_a$, $e_b$, and $e_c$ represent the reverse electromotive forces of the three-phase coil windings, respectively; Ls is an inductance of the three-phase coil winding of the stator; Rs is a resistance of the three-phase coil winding of the stator; $\omega$ is an electrical angular frequency of the permanent-magnet synchronous motor; and j is a coefficient.

In 4), the position angle of the rotor assembly can be calculated as follows:
performing clark transformation on the reverse electromotive forces $e_a$, $e_b$, and $e_c$ to obtain $e_\alpha$ and $e_\beta$:

$$\begin{cases} e_\alpha = \frac{1}{3}(2e_a - e_b - e_c) \\ e_\beta = \frac{\sqrt{3}}{3}(e_b - e_c) \end{cases}$$

calculating an arctangent of $e_\alpha$ and $e_\beta$ to obtain the position angle of the rotor:

$$\theta_0 = \arctan\left(\frac{e_\alpha}{e_\beta}\right).$$

In 6), the resistance torque to stop the rotor assembly is calculated by:

$$T_e = i_s \times \sin(\theta_{is} - \omega_0 * t - \theta_0) \times 1.5 \times np \times \varphi_f$$

where, $i_s$ a current vector on a dq-axis; $\theta_{is}$ is an angle of the current vector; np is a number of poles of the permanent-magnet synchronous motor; φf is a magnetic flux of the permanent magnet; ω0 is an angular velocity at which the permanent-magnet synchronous motor operates at low speeds; and t is time.

When $\theta_{is}$ is equal to $\theta_0$, a continuous negative torque is generated during a next half electrical cycle, to stop the rotor in low-speed rotation.

Following 6), the method further comprises 7) running a normal start-up program for the permanent-magnet synchronous motor.

The normal start-up program comprises providing an initial current for an open-loop control to initiate the rotation of the permanent-magnet synchronous motor, and then switching to a closed-loop control once the permanent-magnet synchronous motor runs at a speed V0.

The speed V0 is in the range of 300 rpm to 400 rpm.

The following advantages are associated with the disclosed method:

(1) The disclosed method allows for the rapid stopping of the rotor assembly during high-speed counter-wind rotation state before starting the motor, followed by the completion of the normal start-up process. The method improves the success rate of starting the permanent-magnet synchronous motor in this state without waiting for external wind forces to decrease, providing convenience to users. Even if the external wind suddenly becomes strong again during this state, the rotor assembly can still be rapidly stopped when the phase currents of each coil winding are all smaller than the preset threshold current value I0. This ensures a complete response strategy, resulting in a higher success rate of starting the motor, and ultimately leading to stable and reliable operation.

(2) The disclosed method utilizes an angle estimation strategy during short-circuit braking to estimate the real-time position of the rotor in the motor. After the permanent-magnet synchronous motor is stopped, the estimated rotor position is used for pre-positioning, increasing the success rate of pre-positioning for subsequent normal start-up and operation.

(3) The following examples provide a detailed description of other advantages of the disclosed method.

In the drawings, the following reference numbers are used: 1. Motor body; 2. Motor controller; 3. Wind wheel; 11. Casing assembly; 12. Stator assembly; 13. Rotor assembly; 21. Control circuit board; and 22. Control box.

DETAILED DESCRIPTION

To further illustrate the disclosure, examples detailing a method for pre-positioning a rotor of an outdoor fan in a high-speed counter-rotation state before operation are described below. It should be noted that the following examples are intended to describe and not to limit the disclosure.

Figure 1:
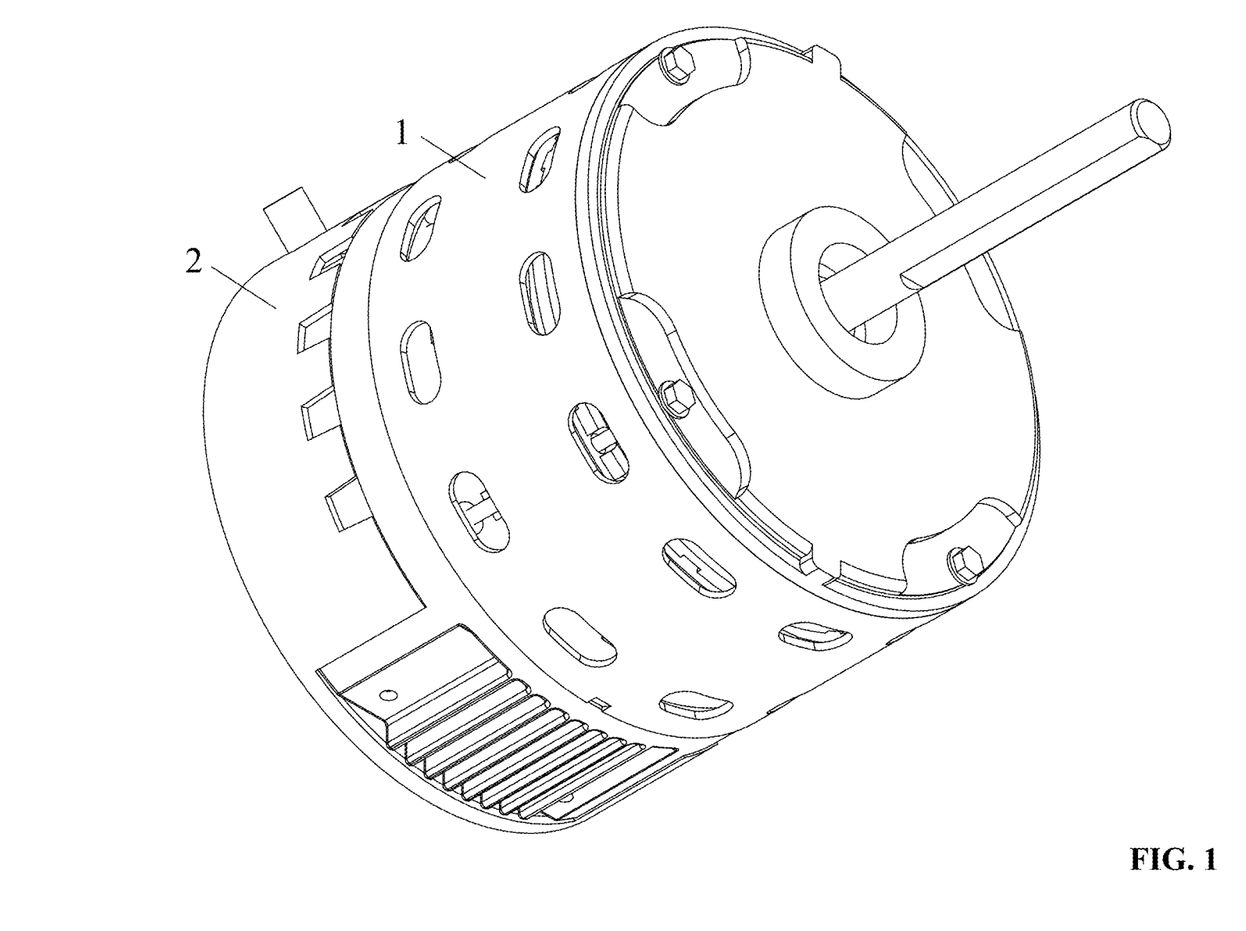
FIG. 1 is a perspective view of a permanent-magnet synchronous motor according to one example of the disclosure.
Figure 2:
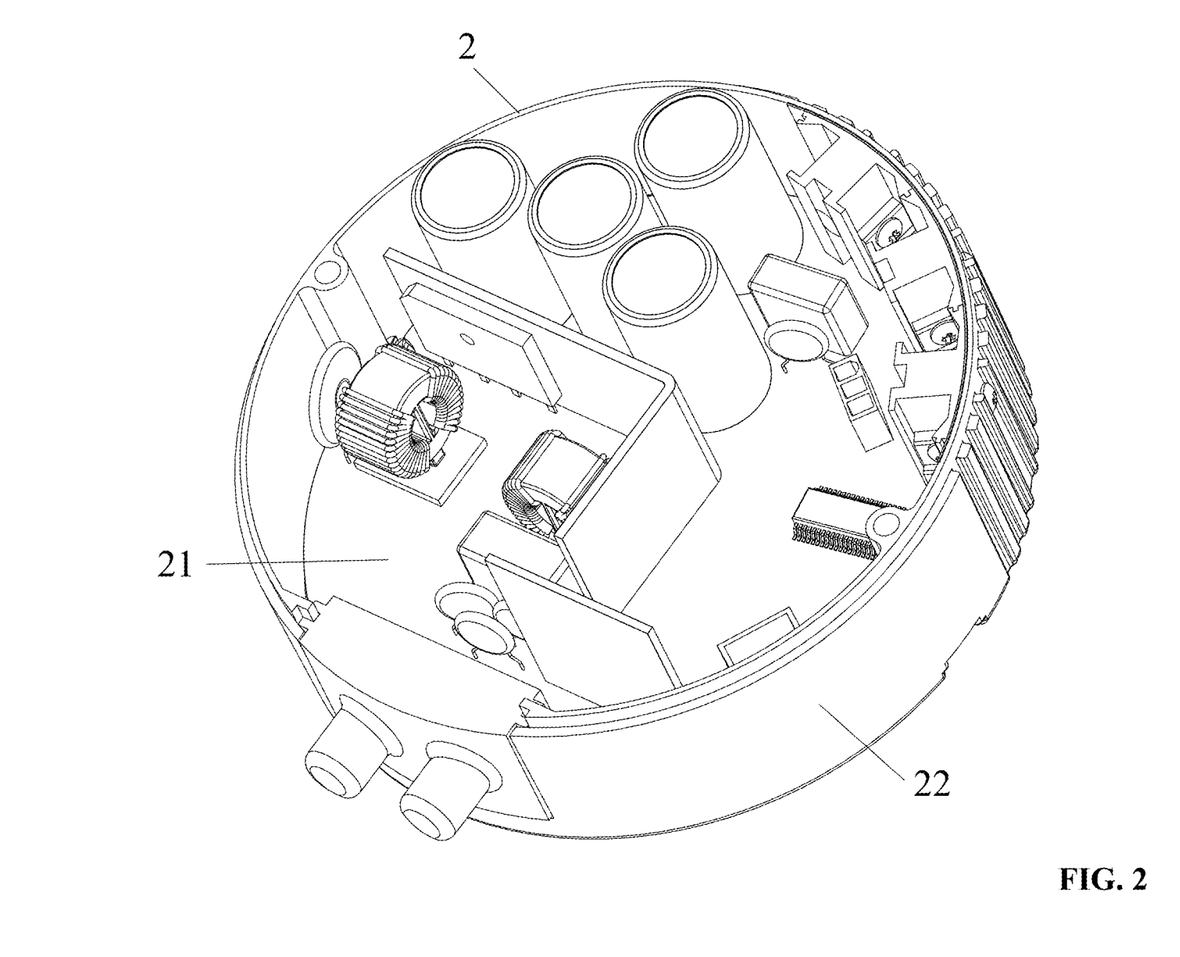
FIG. 2 is a perspective view of a motor controller according to one example of the disclosure.
Figure 3:
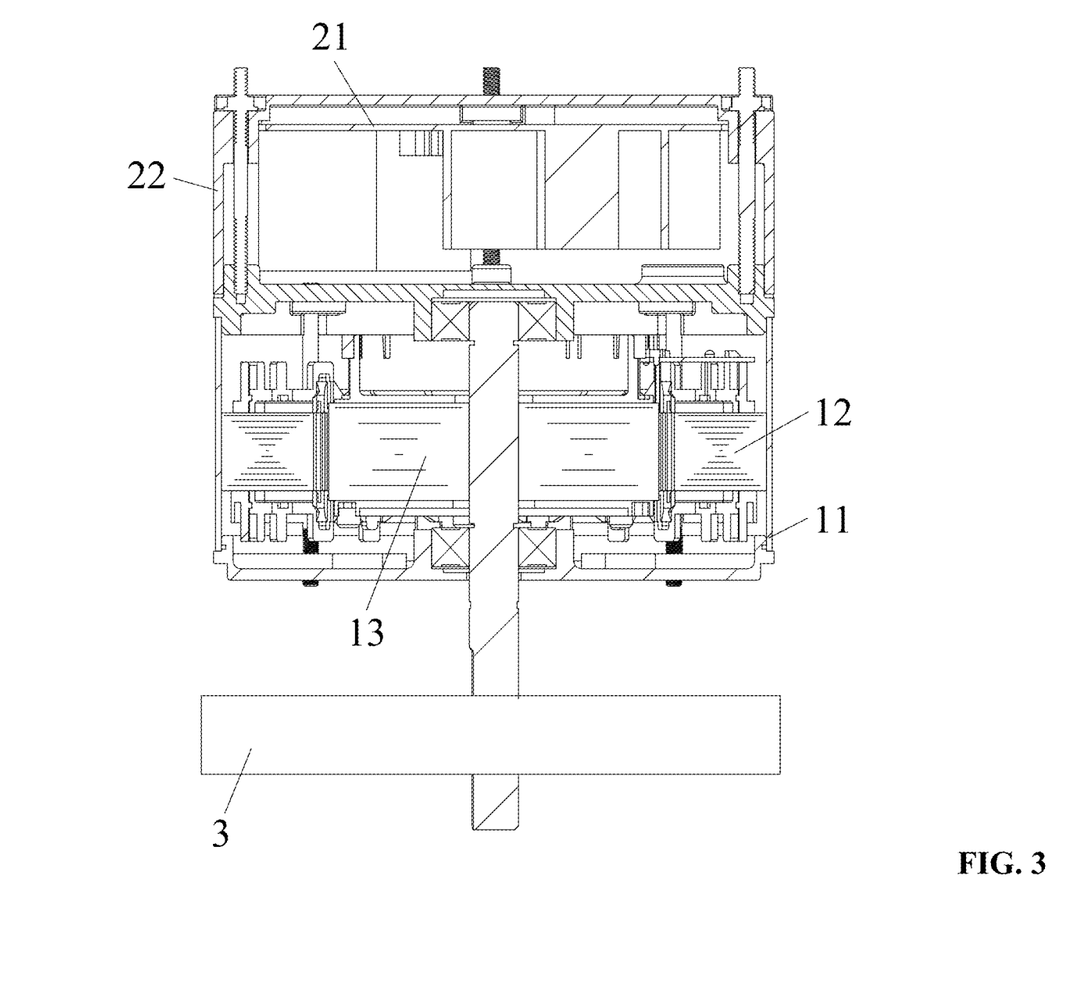
FIG. 3 is a cross-sectional view of an outdoor fan according to one example of the disclosure.
Figure 4:
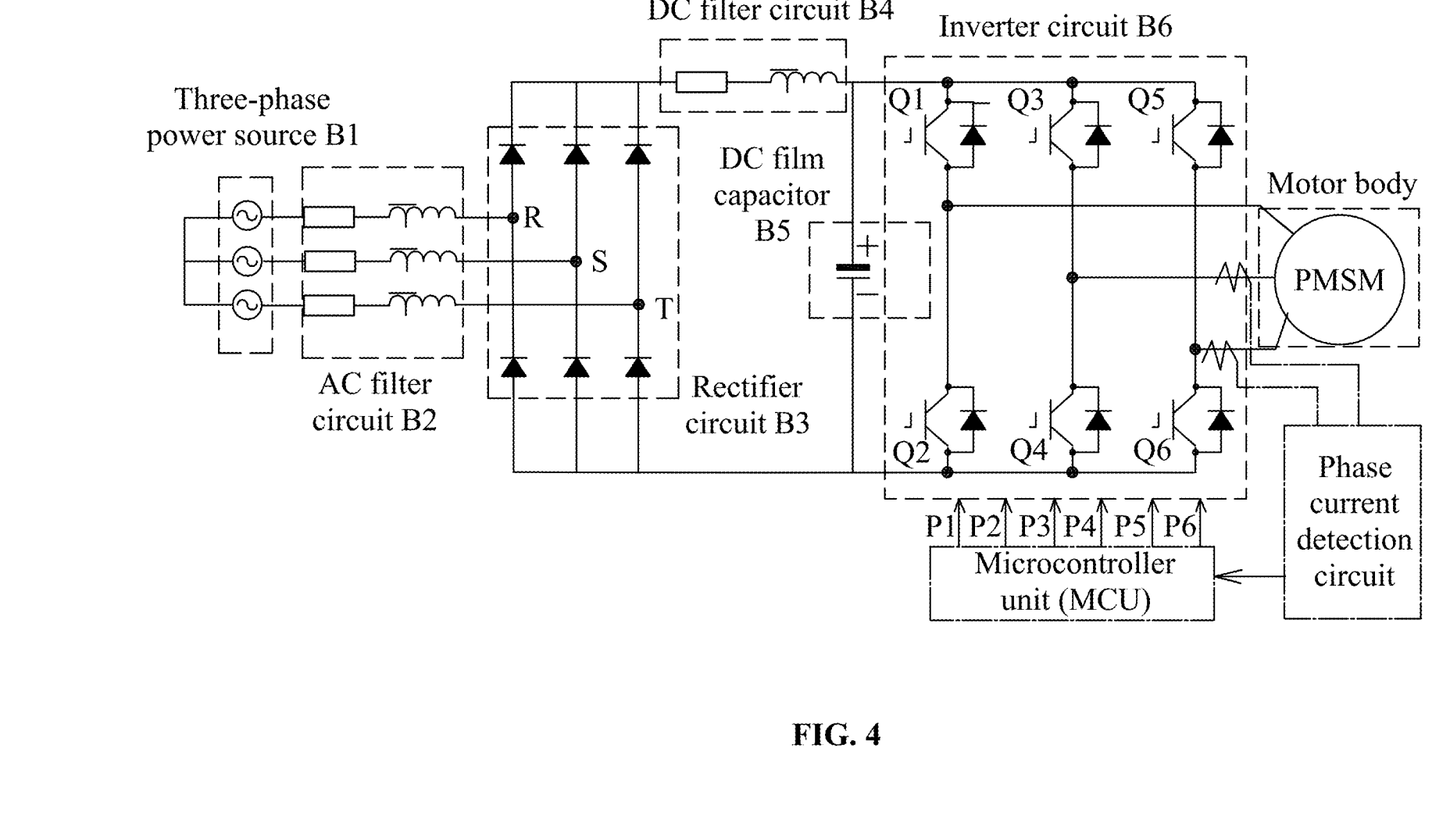
FIG. 4 is a circuit diagram of a permanent-magnet synchronous motor according to one example of the disclosure.

As shown in FIGS. 1-3, an outdoor fan comprises a permanent-magnet synchronous motor and a wind wheel 3. The permanent-magnet synchronous motor comprises a motor body 1 and a motor controller 2. The motor body 1 comprises a stator assembly 12, a rotor assembly 13, and a casing assembly 11. The stator assembly 12 comprises a stator core and a coil winding wound around the stator core. The stator assembly 12 is disposed on the casing assembly 11. The rotor assembly 13 is disposed inside the stator assembly 12. The motor controller 2 comprises a control box 22 and a control circuit board 21 disposed inside the control box 22. A plurality of electronic components is disposed on the control circuit board 21. As shown in FIG. 4, the control circuit board 21 comprises a rectification circuit, a DC bus, an inverter circuit, a microcontroller unit (MCU), a phase current detection circuit, and a rotor position detection circuit.

As shown in FIG. 4, specifically, the motor controller comprises an AC filter circuit B2, a rectifier circuit B3, a DC filter circuit B4, a DC film capacitor B5, an inverter circuit B6, a microcontroller unit (MCU), and a phase current detection circuit. A three-phase power source B1, which is an AC power source, is configured to charge the DC film capacitor B5 through the AC filter circuit B2, the rectifier circuit B3, and the DC filter circuit B4. The DC film capacitor B5 is configured to provide high-voltage DC power to the inverter circuit B6. The phase current detection circuit is configured to measure the phase current flowing through the coil winding and send a signal to the MCU. MCU is configured to control the on/off of the coil winding for each phase by controlling the inverter circuit B6. The permanent-magnet synchronous motor adopts an FOC (Field Oriented Control) method for controlling the magnetic field orientation. The motor body 1 is a three-phase motor, and the stator assembly comprises a three-phase coil winding. The inverter circuit B6 comprises three bridge arms each comprising an upper bridge arm and a lower bridge arm. The three upper bridge comprise three upper electronic switching tubes Q1, Q3, and Q5, respectively; and the three lower bridge arms comprises three lower electronic switching tubes Q2, Q4, and Q6, respectively.

Figure 8:
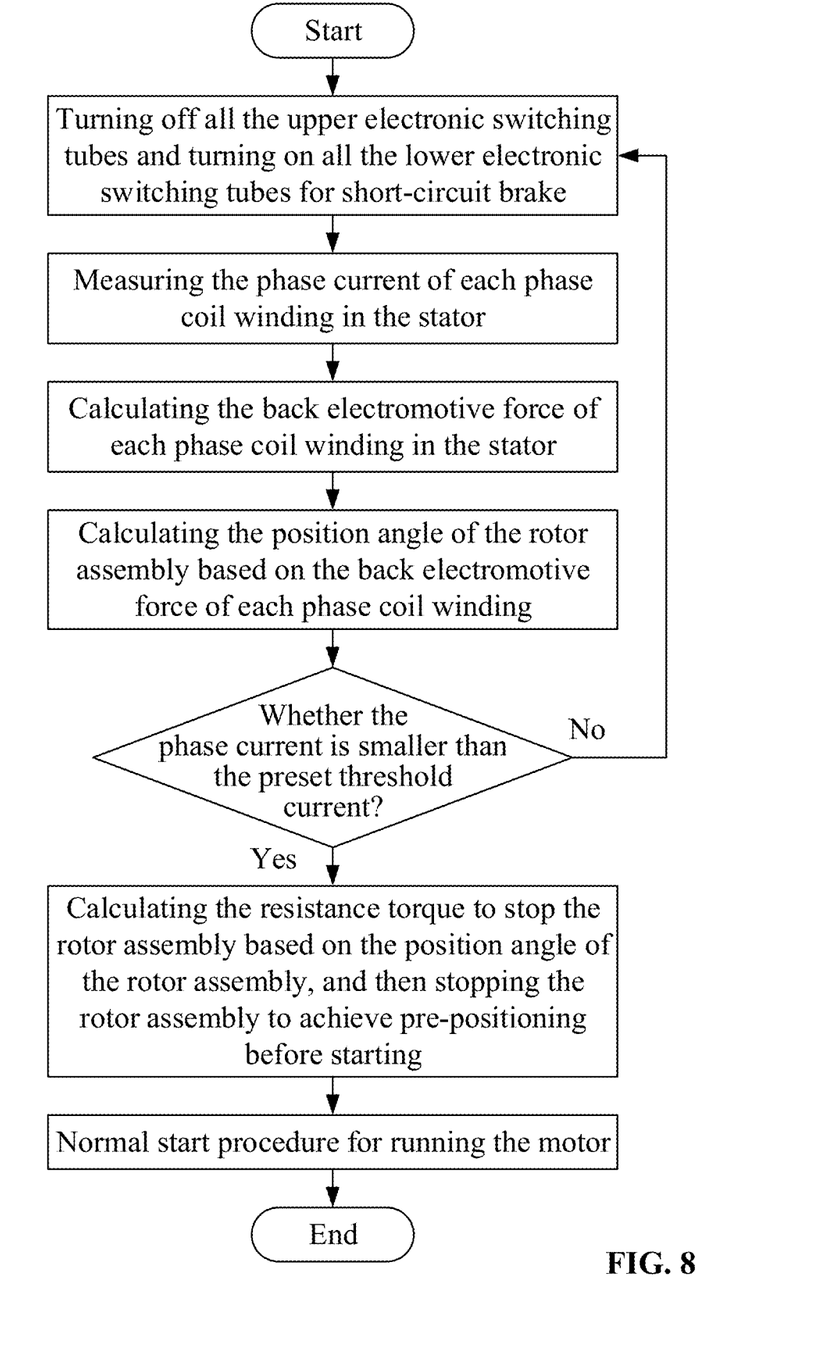
FIG. 8 is a flowchart of a control process according to one example of the disclosure.

As shown in FIG. 8, a method for pre-positioning the rotor during a high-speed counter-rotation state before starting an outdoor fan is provided. Specifically, the outdoor fan comprises a permanent-magnet synchronous motor and a wind wheel. The permanent-magnet synchronous motor comprises a motor body and a motor controller. The motor body comprises a stator assembly and a permanent-magnet rotor assembly. The motor controller comprises a microprocessor and an inverter circuit. The inverter circuit comprises a plurality of bridge arms, and each bridge arm comprises an upper bridge arm and a lower bridge arm; each upper bridge arm comprises an upper electronic switching tube; and each lower bridge arm comprises a lower electronic switching tube. The method for pre-positioning the rotor comprises:

1) during the high-speed counter-operation state, sending, by the microprocessor, a signal to the inverter circuit to turn off all the upper electronic switching tubes and turn on all the lower electronic switching tubes, thereby achieving a short-circuit brake to reduce the counter-rotation speed;
2) measuring the phase current of each phase coil winding in the stator;
3) calculating the back electromotive force of each phase coil winding in the stator based on the phase currents of each phase coil winding;
4) calculating the position angle $\theta_0$ of the rotor assembly based on the back electromotive force of each phase coil winding;
5) checking if the phase currents of each phase coil winding are all smaller than the preset threshold current I0; if not, return to 1); if yes, proceed to 6); and
6) calculating the resistance torque to stop the rotor assembly based on the position angle $\theta_0$ of the rotor assembly, and then stopping the rotor assembly to achieve pre-positioning before starting.

The operating principle of 1) is as follows: the coil winding of the stator assembly is cut by the magnetic field of the permanent magnet in the rotor assembly during the high-speed counter-rotation state. This generates a back electromotive force in the coil winding of the stator assembly. The microprocessor sends a signal to the inverter circuit to turn off all the upper electronic switching tubes and turn on all lower bridge arm electronic switching tubes. And the phase coil winding in the stator assembly is short-circuited, which generates braking torque and enables short-circuit braking. As a result, the speed of the counter-rotation of the permanent-magnet synchronous motor gradually decreases.

The disclosed method allows for the rapid stopping of the rotor assembly during high-speed counter-wind rotation state before starting the motor, followed by the completion of the normal start-up process. The method improves the success rate of starting the permanent-magnet synchronous motor in this state without waiting for external wind forces to decrease, providing convenience to users. Even if the external wind suddenly becomes strong again during this state, the rotor assembly can still be rapidly stopped when the phase currents of each coil winding are all smaller than the preset threshold current value I0. This ensures a more complete response strategy, resulting in a higher success rate of starting the motor, and ultimately leading to stable and reliable operation.

The permanent-magnet synchronous motor is a three-phase permanent-magnet synchronous motor, and the phase currents flowing through the three-phase coil windings A, B, and C are respectively $i_a$, $i_b$, and $i_c$.

In 2), the phase currents $i_a$, $i_b$, and $i_c$ are detected through current sensors or sampling resistors.

Figure 5:
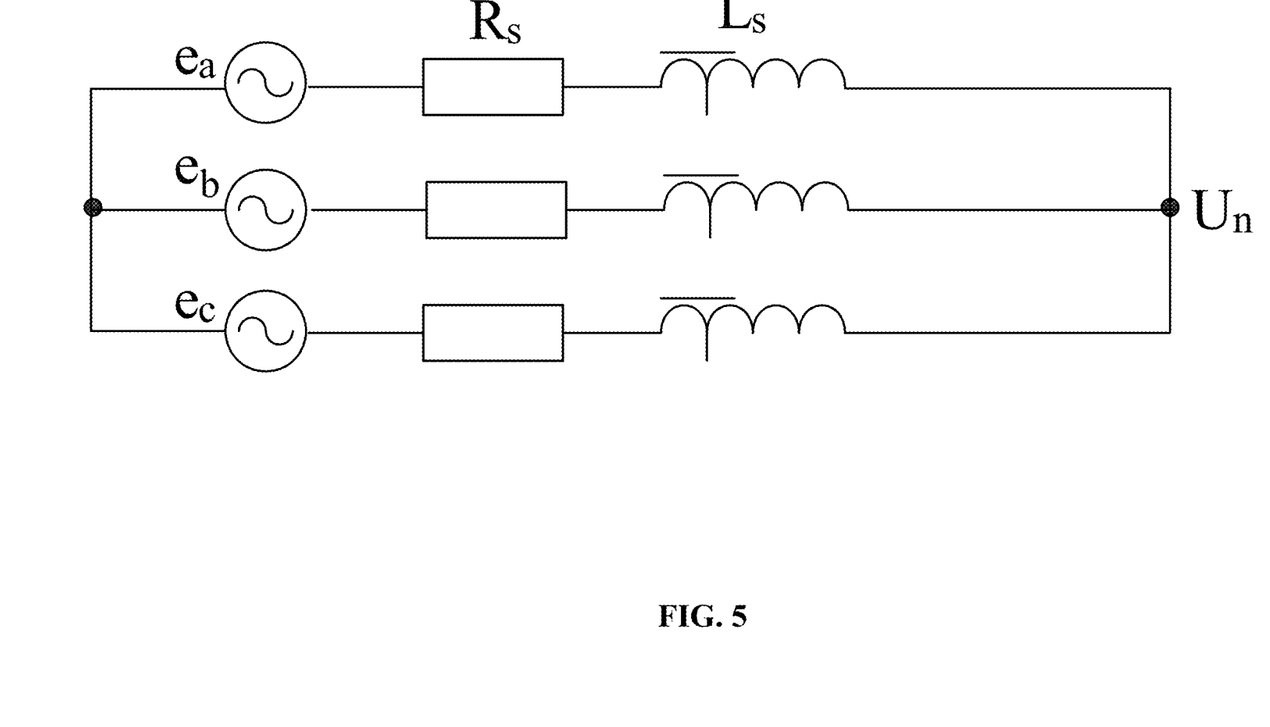
FIG. 5 is an equivalent circuit diagram of a braking state according to one example of the disclosure.

Voltage equations are derived from a simplified circuit under the short-circuit braking state, using the negative pole of a busbar capacitor as the reference voltage. As depicted in FIG. 5, the reverse electromotive forces $e_a$, $e_b$, and $e_c$ of the three-phase coil windings of the permanent-magnet synchronous motor are calculated. $U_n$ is the voltage of the neutral point in the coil winding; Ls is the inductance of the three-phase coil winding of the stator; Rs is the resistance of the three-phase coil winding of the stator; and $\omega$ is the operating electrical angular frequency of the motor. The voltage equations are expressed as follows:

$$\begin{cases} -U_n = -e_a + (j\omega L_s + R_s)i_a \\ -U_n = -e_b + (j\omega L_s + R_s)i_b \\ -U_n = -e_c + (j\omega L_s + R_s)i_c \end{cases}$$

$$\begin{cases} e_a + e_b + e_c = 0 \\ i_a + i_b + i_c = 0 \end{cases};$$

A solution to the voltage equations is $U_n=0$. The reverse electromotive forces of the three-phase coil windings of the permanent-magnet synchronous motor are represented by mathematical expressions that depend on the phase current during the short-circuit braking. In 3), the reverse electromotive force of each phase coil winding is calculated as follows:

$$\begin{cases} e_a = (j\omega L_s + R_s)i_a \\ e_b = (j\omega L_s + R_s)i_b \\ e_c = (j\omega L_s + R_s)i_c \end{cases};$$

where, $e_a$, $e_b$, and $e_c$ represent the reverse electromotive forces of the three-phase coil windings, respectively; Ls is the inductance of the three-phase coil winding of the stator assembly; Rs is the resistance of the three-phase coil winding of the stator; $\omega$ is the electrical angular frequency of the motor; and j is a coefficient.

In 4), the position angle of the rotor assembly can be calculated as follows:

a Clark transformation is performed on the reverse electromotive forces $e_a$, $e_b$, and $e_c$ to obtain $e_\alpha$ and $e_\beta$; and $$\begin{cases} e_\alpha = \frac{1}{3}(2e_a - e_b - e_c) \\ e_\beta = \frac{\sqrt{3}}{3}(e_b - e_c) \end{cases};$$

the position angle of the rotor is determined by calculating the arctangent of $e\alpha$ and $e\beta$.

$$\theta_0 = \arctan\left(\frac{e_\alpha}{e_\beta}\right);$$

It is determined whether the phase currents $i_a$, $i_a$, and $i_a$ of the three-phase coil windings are all smaller than the preset current threshold value I0. Throughout the short-circuit braking process, the fan blades continuous experience a headwind blowing, which leads to a persistent reverse load torque. The final short-circuit current generated by short-circuit braking produces a forward electromagnetic torque that balances out the reverse load torque. At this equilibrium state, the permanent-magnet synchronous motor operates at a constant speed of ω0. When the short-circuit braking currents (i.e., the three-phase currents ia, ib, and ic) are greater than the current threshold value I0, it indicates that the permanent-magnet synchronous motor is still running at a higher speed, and the short-circuit braking process returns to 1). Conversely, when the short-circuit braking currents (i.e., the three-phase currents ia, ib, and ic) are all smaller than the current threshold value I0, it indicates that the permanent-magnet synchronous motor has achieved the pre-positioning condition and the process proceeds to 6).

Figure 6:
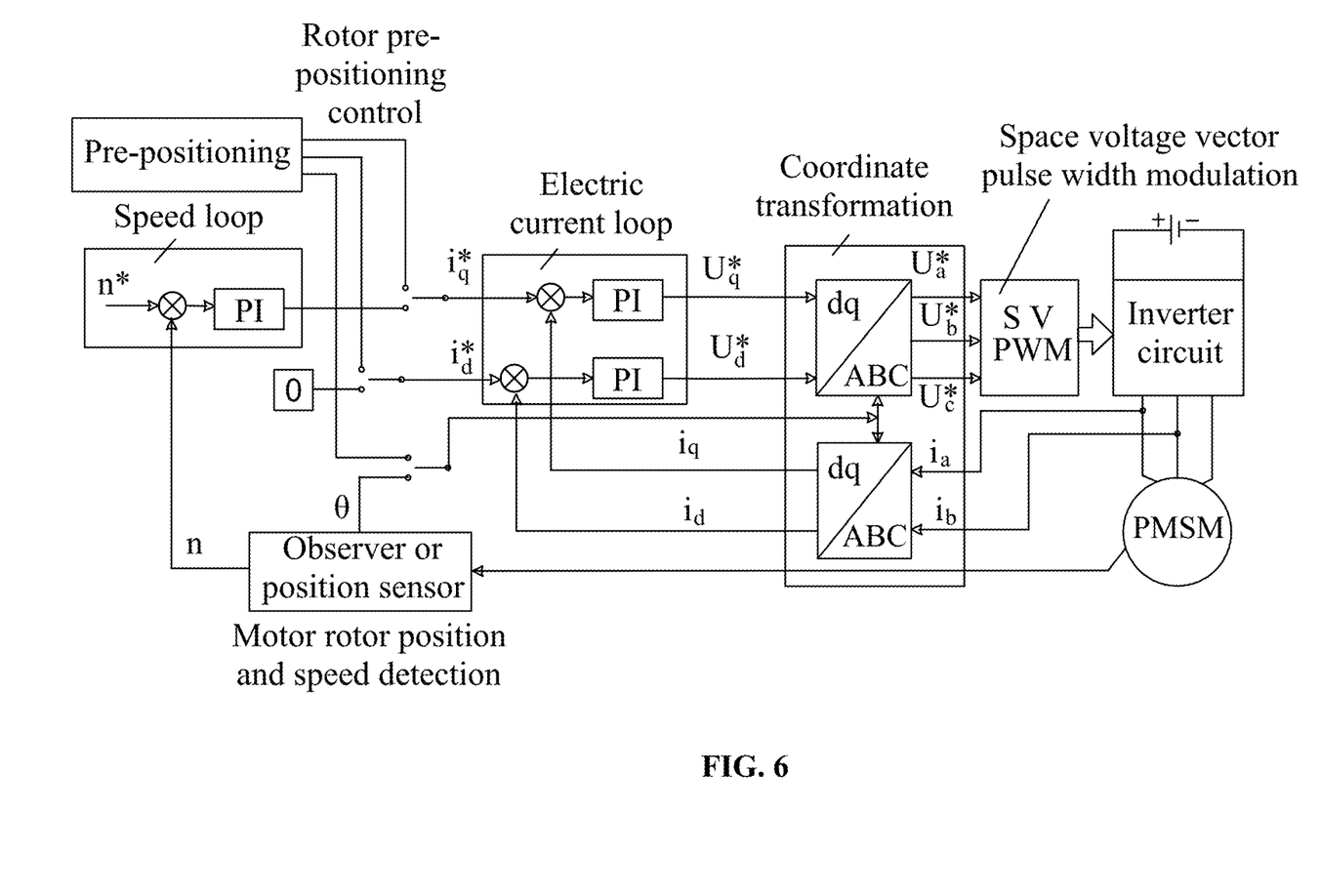
FIG. 6 is a schematic diagram of a principle of vector control according to one example of the disclosure.
Figure 7:
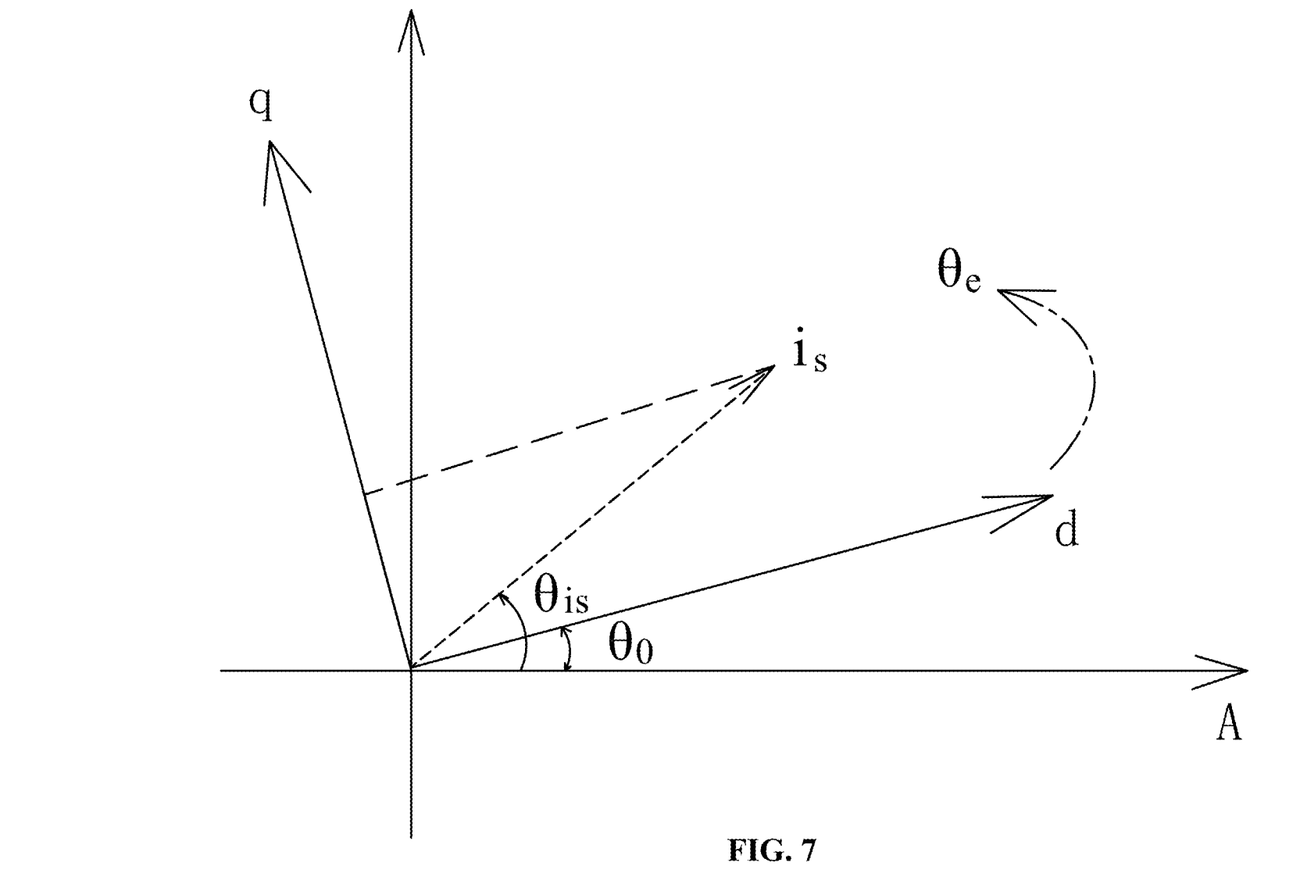
FIG. 7 is a schematic diagram of a principle of calculating the resistance torque when stopping the rotor assembly according to one example of the disclosure.

The rotor is positioned by applying current in a specific direction to fix the rotor assembly. As shown in FIG. 6, the magnitude of the current on the dq-axis and the angle of the current vector are regulated. As shown in FIG. 7, $i_s$ the current vector, $\theta_{is}$ is the angle of the current vector, and $\theta_e$ is the actual position of the rotor in the motor; then the electromagnetic torque is calculated by:

$$T_e = i_s \times \sin(\theta_{is} - \theta_e) \times 1.5 \times np \times \varphi_f;$$

where np is the number of poles of the motor, and φf is the magnetic flux of the permanent magnet.

As the permanent-magnet synchronous motor is still running at a low speed $\omega_0$, $\theta e = \omega_0 * t + \theta_0$, where $\theta_0$ is the position angle of the rotor assembly in 4) and is substituted into the following electromagnetic torque formula:

$$T_e = i_s \times \sin(\theta_{is} - \omega_0 * t - \theta_0) \times 1.5 \times np \times \varphi_f;$$

When $\theta_{is}$ is equal to $\theta_0$, a continuous negative torque is generated during a next half electrical cycle, to stop the rotor in low-speed rotation. Therefore, in 6), the optimal pre-positioning angle of the current is $\theta_0$, which maximizes the success rate of stopping the fan motor.

Following 6), 7) comprises running the normal start-up program for the fan motor.

The normal start-up program comprises providing an initial current for open-loop control to initiate the rotation of the fan motor, and then switching the closed-loop control once the permanent-magnet synchronous motor runs at a speed V0.

The speed V0 is in the range of 300 rpm to 400 rpm.

Figure 9:
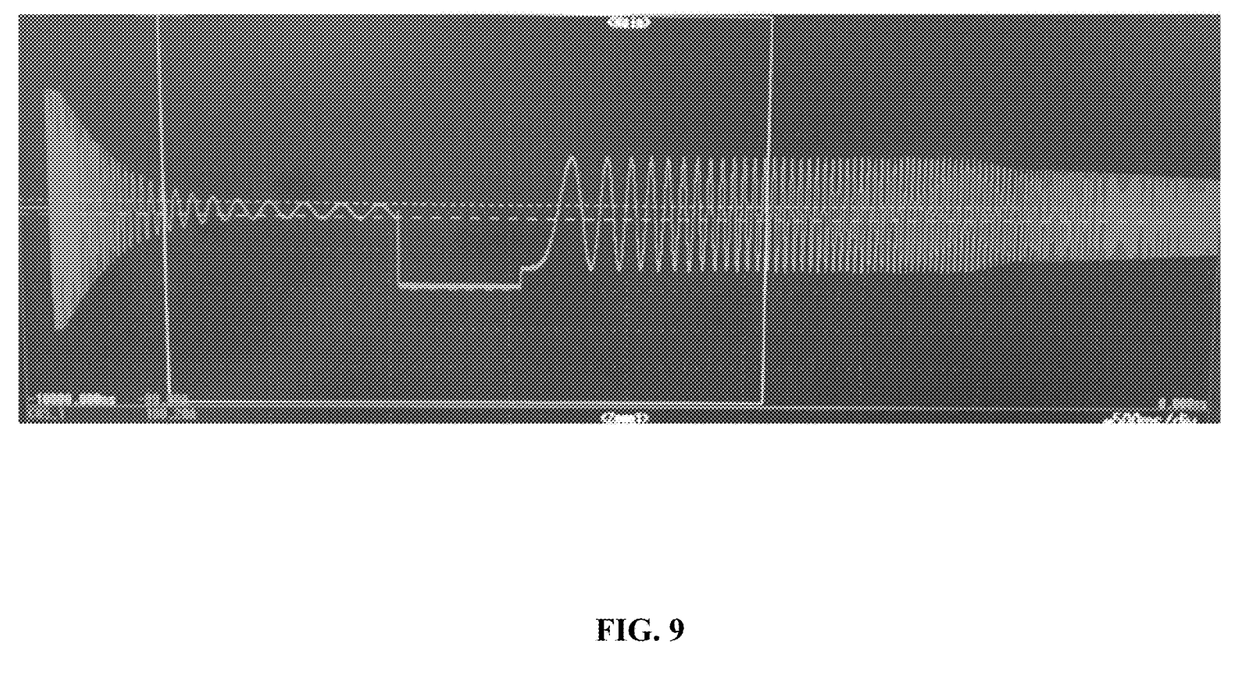
FIG. 9 is a schematic diagram of the change in current of one phase coil winding detected using experimental means during an operation process according to one example of the disclosure.

The disclosed method has been tested through experimental, simulation, and practical application, and has been found to be feasible. The results of these tests are displayed in FIG. 9. The outdoor fan, which is powered by a low-voltage DC BLDC motor, has been able to achieve stable start-up at 800 rpm against the wind before starting. FIG. 9 is a graph showing an A-phase current of the motor. After the short-circuit braking, the permanent-magnet synchronous motor runs smoothly at a low speed, then undergoes pre-positioning, and finally completes the normal start-up process. Without the disclosed method, the outdoor fan would be unable to start at 800 rpm against the wind before starting.

It will be obvious to those skilled in the art that changes and modifications may be made, and therefore, the aim in the appended claims is to cover all such changes and modifications.

What is claimed is:

1. A method for pre-positioning a rotor of an outdoor fan in a high-speed counter-rotation state before operation, the outdoor fan comprising a permanent-magnet synchronous motor and a wind wheel; the permanent-magnet synchronous motor comprising a motor body and a motor controller; the motor body comprising a stator assembly and a permanent-magnet rotor assembly; the motor controller comprising a microprocessor and an inverter circuit; the inverter circuit comprising a plurality of bridge arms, and each bridge arm comprising an upper bridge arm and a lower bridge arm; each upper bridge arm comprising an upper electronic switching tube, and each lower bridge arm comprising a lower electronic switching tube, the method comprising:

1) during a high-speed counter-operation state, sending, by the microprocessor, a signal to the inverter circuit to turn off all upper electronic switching tubes and turn on all lower electronic switching tubes, thereby achieving a short-circuit brake to reduce a counter-rotation speed of the wind wheel;
2) measuring a phase current of each phase coil winding in the stator assembly;
3) calculating a back electromotive force of each phase coil winding in the stator based on the phase current of each phase coil winding;
4) calculating a position angle $\theta_0$ of the rotor assembly based on the back electromotive force of each phase coil winding;
5) checking if the phase current of each phase coil winding is all smaller than a preset threshold current I0; if not, return to 1); if yes, proceed to 6); and
6) calculating a resistance torque to stop the rotor assembly based on the position angle $\theta_0$ of the rotor assembly, and then stopping the rotor assembly to achieve pre-positioning before starting.

2. The method of claim 1, wherein the permanent-magnet synchronous motor is a three-phase permanent-magnet synchronous motor, and phase currents flowing through three-phase coil windings are respectively $i_a$, $i_b$, and $i_c$.

3. The method of claim 2, wherein in 2), the phase currents $i_a$, $i_b$, and $i_c$ are detected through current sensors or sampling resistors.

4. The method of claim 3, wherein in 3), a reverse electromotive force of each phase coil winding is calculated as follows:

$$\begin{cases} e_a = (j\omega L_s + R_s)i_a \\ e_b = (j\omega L_s + R_s)i_b \\ e_c = (j\omega L_s + R_s)i_c \end{cases};$$

$e_a$, $e_b$, and $e_c$ represent reverse electromotive forces of the three-phase coil windings, respectively; Ls is an inductance of the three-phase coil winding of the stator; Rs is a resistance of the three-phase coil winding of the stator; ω is an electrical angular frequency of the permanent-magnet synchronous motor; and j is a coefficient.

5. The method of claim 4, wherein in 4), the position angle of the rotor assembly is calculated as follows:

performing clark transformation on the reverse electromotive forces $e_a$, $e_b$, and $e_c$ to obtain $e_\alpha$ and $e_\beta$:

$$\begin{cases} e_\alpha = \frac{1}{3}(2e_a - e_b - e_c) \\ e_\beta = \frac{\sqrt{3}}{3}(e_b - e_c) \end{cases};$$

calculating an arctangent of $e_\alpha$ and $e_\beta$ to obtain the position angle of the rotor:

$$\theta_0 = \arctan\left(\frac{e_\alpha}{e_\beta}\right).$$

6. The method of claim 5, wherein in 6), the resistance torque to stop the rotor assembly is calculated by:

$$T_e = i_s \times \sin(\theta_{is} - \omega_0 * t - \theta_e) \times 1.5 \times np \times \varphi_f;$$

where, $i_s$ is a current vector on a dq-axis; $\theta_{is}$ is an angle of the current vector; np is a number of poles of the permanent-magnet synchronous motor; $\varphi f$ is a magnetic flux of the permanent magnet; $\omega 0$ is an angular velocity at which the permanent-magnet synchronous motor operates at low speeds; and t is time.

7. The method of claim 6, wherein when $\theta_{is}$ is equal to $\theta_0$, a continuous negative torque is generated during a next half electrical cycle, to stop the rotor in low-speed rotation.

8. The method of claim 7, wherein following 6), the method further comprises 7): running a normal start-up program for the permanent-magnet synchronous motor.

9. The method of claim 8, wherein the normal start-up program comprises providing an initial current for an open-loop control to initiate the rotation of the permanent-magnet synchronous motor, and then switching to a closed-loop control once the permanent-magnet synchronous motor runs at a speed V0.

10. The method of claim 8, wherein the speed V0 is in the range of 300 rpm to 400 rpm.

\* \* \* \* \*